United States Patent Office 3,792,131
Patented Feb. 12, 1974

3,792,131
O-METHYL-O-(4-BROMO-2,5-DICHLOROPHENYL) PHENYLPHOSPHONATE
Sidney B. Richter, Chicago, Ill., assignor to Velsicol Chemical Corporation, Chicago, Ill.
No Drawing. Filed Aug. 3, 1970, Ser. No. 60,716
Int. Cl. A01n 9/36; C07f 9/40
U.S. Cl. 260—961                                     1 Claim

ABSTRACT OF THE DISCLOSURE

The subject matter of this application is O-alkyl O-(4-bromo-2,5-dichlorophenyl) phenylphosphonates useful as insecticides and miticides.

---

This invention relates to new phosphonates useful as insecticides and miticides. In particular this invention relates to O-alkyl O-(4-bromo-2,5-dichlorophenyl) phenylphosphonates.

The compounds of the present invention have the following structural formula:

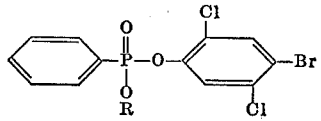

wherein R is alkyl.

These compounds can be prepared by reacting 4-bromo-2,5-dichlorophenol with an O-alkyl phenylphosphonyl chloride as illustrated by the following example:

EXAMPLE 1

Preparation of O-methyl O-(4-bromo-2,5-dichlorophenyl) phenylphosphonate 4-bromo-2,5-dichlorophenol (133 grams; 0.55 mol) was dissolved in acetone (150 ml.) containing sodium hydroxide (0.22 grams; 0.55 mol) and cooled with stirring. O-methyl phenylphosphonyl chloride (89.5 grams; 0.47 mol) dissolved in acetone (150 ml.) was added over a one hour period with continuous stirring and cooling. Stirring of the reaction mixture was continued for 3 hours. The reaction mixture was cooled and filtered. Then it was washed with acetone and ether, after which the solvent was evaporated therefrom by use of a rotary evaporator. The residue was dissolved in ether and washed once with sodium hydroxide (1%), twice with water and again with ether. It was then dried over magnesium sulfate, filtered and evaporated. The product (105 grams) had a purity of 78% as analyzed by gas chromatography. The product was then passed through a falling film distillation column at 0.03–0.05 mm. for about 2.5 hours. The residue (74 grams) contained about 90% of the desired product. Elemental analysis was as follows: Theoretical, percent: C, 39.4; H, 2.5; Br, 20.2; Cl, 17.9; P, 7.8. Found, percent: C, 39.54; H, 2.22; Br, 20.11; Cl, 18.01; P, 7.48.

Other compounds within the scope of the present invention can be prepared by the foregoing procedure by substituting for the phosphonyl chloride reactant as follows:

| Reactant | Product |
|---|---|
| O-ethyl phenylphosphonyl chloride. | O-ethyl O-(4-bromo-2,5-dichlorophenyl) phenylphosphonate. |
| O-propyl phenylphosphonyl chloride. | O-propyl O-(4-bromo-2,5-dichlorophenyl) phenylphosphonate. |
| O-butyl phenylphosphonyl chloride. | O-butyl O-(4-bromo-2,5-dichlorophenyl) phenylphosphonate. |
| O-pentyl phenylphosphonyl chloride. | O-pentyl O-(4-bromo-2,5-dichlorophenyl) phenylphosphonate. |
| O-hexyl phenylphosphonyl chloride. | O-hexyl O-(4-bromo-2,5-dichlorophenyl) phenylphosphonate. |
| O-decyl phenylphosphonyl chloride. | O-decyl O-(4-bromo-2,5-dichlorophenyl) phenylphosphonate. |

While the "R" substituent of the compounds represented by the foregoing structural formula can be alkyl having various numbers of carbon atoms, for most purposes it is preferred that "R" be lower alkyl. In this instance lower alkyl means having from 1 to about 6 carbon atoms.

For practical use as insecticides, the compounds of this invention are generally incorporated into insecticidal compositions which comprise an inert carrier and an insecticidally toxic amount of such a compound. Such insecticidal compositions, which can also be called formulations, enable the active compound to be applied conveniently to the site of the insect infestation in any desired quantity. These compositions can be solids, such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 2

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the insect infestation.

The compounds of this invention can be applied as insecticides in any manner recognized by the art. One method for destroying insects comprises applying to the locus of the insect infestation, an insecticidal composition comprising an inert carrier and, as the essential active ingredient, in a quantity which is toxic to said insects, a compound of the present invention. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides in the insecticidal compositions heretofore described. These other insecticides can comprise from about 5% to about 95% of the active ingredients in the insecticidal compositions. Use of the combinations of these other insecticides with the compounds of the present invention provide insecticidal compositions which are more effective in controlling insects and often provide results unattainable with separate compositions of the individual insecticides. The other insecticides with which the compounds of this invention can be used in the insecticidal compositions to control insects, can include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl)ether], isobornyl thiocyanoacetate, and the like; as well as such substances usually referred to as fumigants, as hydrogen cyanide, carbon tetrachloride, calcuim cyanide, carbon disulfide, ethylene dichloride, propylene dichloride, ethylene dibromide, ethylene oxide, methyl bromide, paradichlorbenzene, and the like.

The compounds of the present invention can also be combined with fungicidal and nematocidal chemical compounds to form pesticidal compositions useful for the control of fungi and in some cases soil nematodes as well as insects. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate, and the like; while examples of nematocidal compounds are chloropicrin, O,O-diethyl O-(2,4-dichlorophenyl) phosphorothioate, tetrachlorothiophene, dazomet, dibromochloropropane, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-sucking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compounds of this present invention, such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

In order to demonstrate the insecticidal and miticidal activity of the compounds of the present invention, tests were performed using O-methyl O-(4-bromo-2,5-dichlorophenyl) phenylphosphonate as the test compound.

In one experiment wherein the activity of the compounds of the present invention as contact miticides was determined, the test compound was formulated at a concentration of 3500 p.p.m. as an aqueous emulsion of an acetone solution and was sprayed onto Henderson bush lima bean plants, each infested with about 100 adult two-spotted spider mites (*Tetranychus urticae*). The treated plants were then placed into a holding room and were supplied with their daily requirements of water and light. After a period of five days the mortality of the mites was determined and rated on a percent basis in comparison to the untreated control. The percent mortality was 90%.

In a second experiment for the control of the housefly, each of 50 flies was contacted with the test compound by applying 1μ l. of test formulation, containing the indicated concentration of test compound to the dorsum of its thorax. The flies were then placed in a wire mesh cage where they were supplied with sugar syrup. At the end of a 24 hour period the mortality of the flies was observed and recorded in comparison to the untreated control as follows:

| Concentration (p.p.m.): | Percent mortality |
|---|---|
| 1000 | 100 |
| 100 | 100 |
| 10 | 80 |

In a third experiment, lima bean leaves were sprayed on the top and bottom surfaces with a solution of the test compound in acetone at the stated concentrations and offered to ten larvae of the southern armyworm (late third instar stage) for a feeding period of 48 hours. After this period the mortality was observed as follows:

| Concentration (p.p.m.): | Percent mortality |
|---|---|
| 1000 | 100 |
| 100 | 100 |
| 10 | 80 |

I claim:
1. O-methyl O-(4-bromo-2,5-dichlorophenyl) phenylphosphonate.

References Cited

UNITED STATES PATENTS 3,459,836  8/1969  Richter _____ 260—961
3,149,143  9/1964  Newallis et al. _____ 260—961

OTHER REFERENCES

Derwent Japanese Patents Report, 4, No. 41, p. 9 (November 12, 1965).

LEWIS GOTTS, Primary Examiner
R. L. RAYMOND, Assistant Examiner

U.S. Cl. X.R.

424—222

UNITED STATES PATENT OFFICE
CERTIFICATE OF CORRECTION

Patent No. 3,792,131      Dated February 12, 1974

Inventor(s) Sidney B. Richter

It is certified that error appears in the above-identified patent and that said Letters Patent are hereby corrected as shown below:

In Column 4, line 64 for "80" read -- 36 --.

Signed and sealed this 13th day of August 1974.

(SEAL)
Attest:

McCOY M. GIBSON, JR.
Attesting Officer

C. MARSHALL DANN
Commissioner of Patents